US007490370B2

(12) United States Patent  (10) Patent No.: US 7,490,370 B2
Macey et al.  (45) Date of Patent: Feb. 17, 2009

(54) VIDEO ENTERTAINMENT SYSTEM FOR SPA

(75) Inventors: Stephen S. Macey, Oceanside, CA (US); Christopher Larsen, Vista, CA (US)

(73) Assignee: Watkins Manufacturing Corporation, Vista, CA (US)

( * ) Notice: Subject to any disclaimer, the term of this patent is extended or adjusted under 35 U.S.C. 154(b) by 43 days.

(21) Appl. No.: 11/336,345

(22) Filed: Jan. 20, 2006

(65) Prior Publication Data

US 2007/0169259 A1    Jul. 26, 2007

(51) Int. Cl.
    *A47K 3/00*    (2006.01)
(52) U.S. Cl. .......................... 4/559; 4/541.1; 248/919; 439/372; 439/374
(58) Field of Classification Search ............ 4/494, 4/541.1, 661, 538, 559; 439/372, 374, 534; 348/836, 838–839; 248/127, 917, 919–923
    See application file for complete search history.

(56) References Cited

U.S. PATENT DOCUMENTS

| 1,510,977 | A  | * | 10/1924 | Clark .................... 439/369 |
| 6,754,916 | B1 |   | 6/2004  | Cox |
| 6,868,563 | B1 | * | 3/2005  | Hutchings et al. ............ 4/541.1 |
| 6,935,883 | B2 | * | 8/2005  | Oddsen, Jr. ................ 439/374 |
| 7,073,760 | B2 | * | 7/2006  | Brady ................... 248/291.1 |
| 2002/0020797 | A1 |   | 2/2002 | Artz |
| 2003/0070218 | A1 |   | 4/2003 | Gardenier et al. |
| 2003/0088912 | A1 |   | 5/2003 | Lauter et al. |
| 2004/0068786 | A1 |   | 4/2004 | Lauter et al. |
| 2004/0156517 | A1 |   | 8/2004 | Schmidt et al. |
| 2004/0205889 | A1 |   | 10/2004 | Cox |
| 2004/0222342 | A1 |   | 11/2004 | Brady |
| 2004/0231042 | A1 | * | 11/2004 | Carter ..................... 4/559 |
| 2005/0088620 | A1 |   | 4/2005 | Dwyer et al. |
| 2005/0091739 | A1 |   | 5/2005 | Lerma |
| 2005/0099547 | A1 |   | 5/2005 | Vitito |
| 2005/0236533 | A1 | * | 10/2005 | McRight et al. ............ 248/161 |
| 2006/0094304 | A1 | * | 5/2006 | Masaki et al. .............. 439/850 |
| 2006/0148575 | A1 | * | 7/2006 | Vitito ..................... 463/46 |

FOREIGN PATENT DOCUMENTS

| JP | 4285511 | 10/1992 |
| JP | 11099078 | 4/1999 |
| WO | WO 03/039365 | 5/2003 |

OTHER PUBLICATIONS

International Search Report and Written Opinion of the International Searching Authority, Dec. 4, 2007, PCT/US07/60152, 9 pgs.
English language translation of JP 11-099078, Apr. 13, 1999, pgs.

* cited by examiner

*Primary Examiner*—Robert M Fetsuga
(74) *Attorney, Agent, or Firm*—Leon E. Redman

(57) ABSTRACT

A combination spa and video entertainment system is disclosed wherein the video monitor is removably mountable to the spa so that it does not interfere with spa cover removal or replacement. The transportable video monitor is plug connectable to a mounting post attached to a sidewall of the spa which contains power, video and control cables. The video monitor is also plug connectable to a docking station that may be located indoors, which contains power, video and control cables, for viewing the video monitor indoors when the spa is not being used.

27 Claims, 12 Drawing Sheets

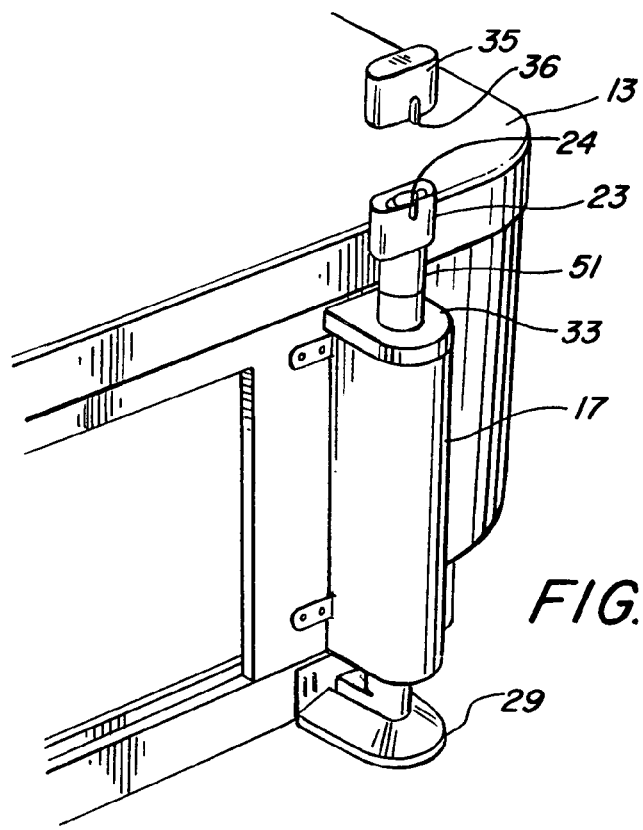
FIG. 5
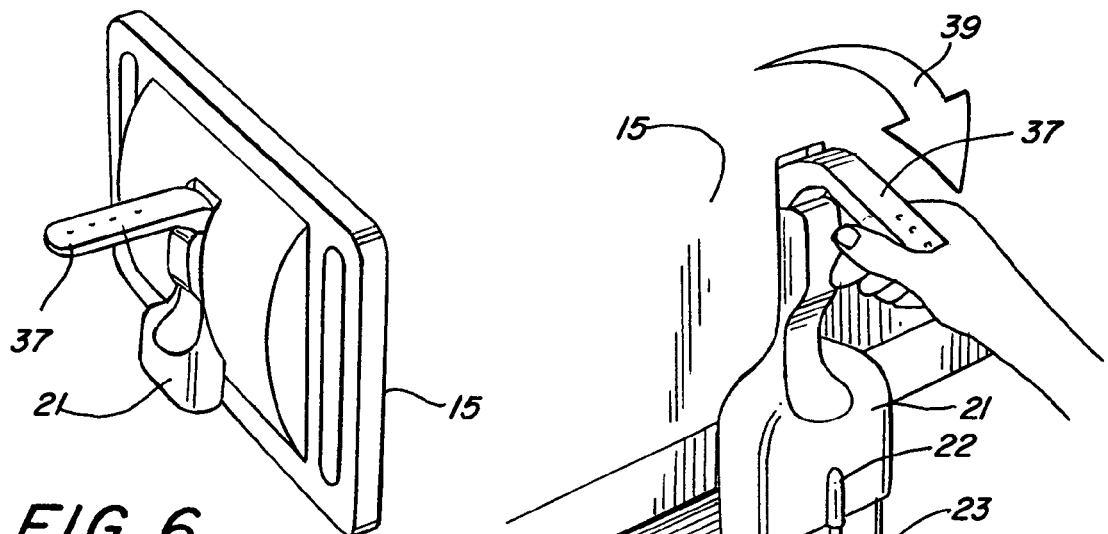
FIG. 6
FIG. 7

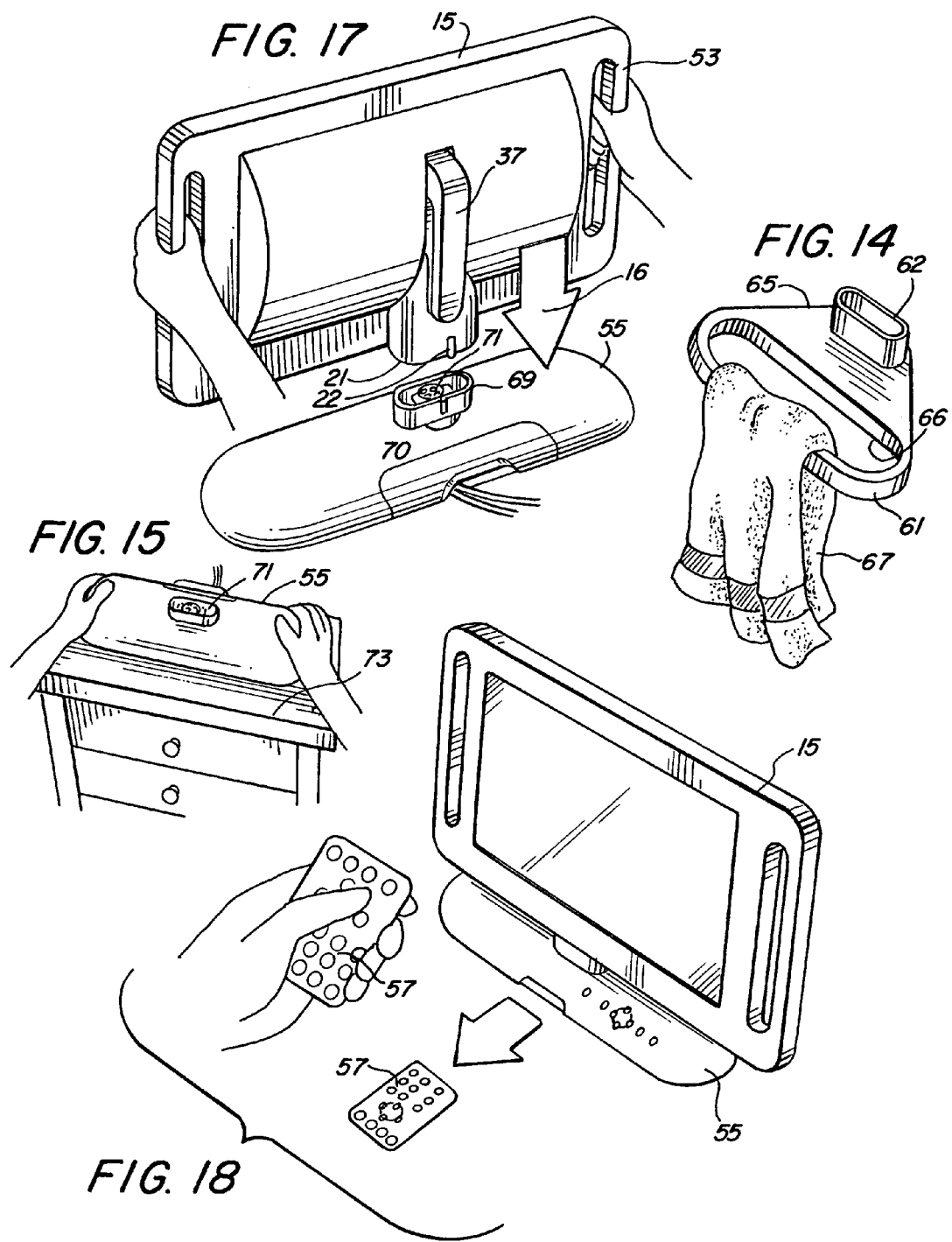

VIDEO ENTERTAINMENT SYSTEM FOR SPA

BACKGROUND OF THE INVENTION

1. Field of the Invention

The present invention relates generally to improvements in spas, and more particularly pertains to new and improved video entertainment systems for spas.

2. Description of Related Art

Current spa entertainment systems are concerned with including the entertainment units within the spa housing in a manner that will protect the entertainment units from the corrosive environment, both while a spa is in use and when the spa is not in use. Most such systems contemplate the raising and lowering of video monitors and speakers into the spa housing, the monitor being raised when occupants of the spa want to view the monitor, the monitor being lowered when the spa is not in use. Examples of such prior art systems can be found in Lauter et al (Publication No. US 2004/0068786 A1) published Apr. 15, 2004, for a combination spa entertainment system, and Lauter et al (Publication No. US 2003/0088912 A1) for a combination spa and entertainment system, published May 15, 2003.

This concept of making entertainment units retractable into the housing for the spa has been adopted by much of the prior art. Examples can be found in Cox (U.S. Pat. No. 6,754,916) for spas having a retractable entertainment unit, granted Jun. 29, 2004. Cox (Publication No. US 2004/0205889 A1) for spas having a retractable antennae unit, published Oct. 21, 2004, Lerma (Publication No. US 2005/0091739 A1) for retractable rotating spa speaker system, published May 5, 2005, and Schmidt et al (Publication No. US 2004/0156517A1) for a retractable speaker system, published Aug. 12, 2004.

For those spas that do not retract entertainment units into a spa housing, the entertainment unit is made a permanent fixture on the spa housing. Examples can be found in Japanese Patent JP11099078 published Apr. 13, 1999, Japanese Patent JP4285511 published Oct. 9, 1992, Gardenier et al (Publication No. US 2003/0070218 A1), published Apr. 17, 2003 for a headrest assembly having an illuminated insert for spa, and Artz (Publication No. US 2002/0020797 A1) for a positionable adjustable support arm for items, published Feb. 21, 2002.

SUMMARY OF THE INVENTION

A combination spa and entertainment system having a portable video monitor adapted to be plug-connected to a support post at the spa or to a docking station located in or around a dwelling. Video and power is supplied to the video monitor through the plugs at both locations. The video monitor may be removed from the support post when the spa is not in use, and be moved to any other convenient location for viewing through the docking station. The docking station is adapted to receive video signals from multiple sources and to receive game control signals. The support post at the spa is adapted to receive multiple video and audio signals.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein:

FIG. 5 is a perspective of the mounting post of the present invention, attached to the spa structure;

FIG. 6 is a rear perspective of the video monitor, according to the present invention;

FIG. 7 is a perspective of the connector for the monitor of the present invention;

FIG. 14 is a perspective view of a towel ring for attachment to the mounting post of the present invention;

FIG. 15 is a perspective view of a video monitoring docking station, according to the present invention;

FIG. 17 is a rear perspective of the video monitor of the present invention being mounted to the docking station of the present invention;

FIG. 18 is a front perspective of the video monitor mounted to the docking station with remote control pad or a controlling unit, according to the present invention.

DETAILED DESCRIPTION OF THE PREFERRED EMBODIMENTS

The purpose of the present invention is to create a unique video entertainment system that solves the issues pertaining to the realities of spa use. Most spa users do not use their spa daily. Typically the use time is no more than one hour. This means that a permanently installed spa video system is unused for most of the product life of the system, while the system remains exposed to the deleterious spa environment. Prior art systems that utilize "pop out" video screens integrated into the spa shell, are fixed position devices that users cannot adjust as to viewing angle. Furthermore, the spa cover must be removed before these video screens can be used.

One of the advantages of the present invention over these prior art systems are that the video monitor of the system is ruggedized so that it can work in the spa environment and can be easily moved to the location of the docking station. The docking station can be used in a motorhome, in a tailgating application, and most anywhere there is electrical power and a place to set the docking station down.

When on the spa, the video monitor is set on a mounting pole outside the spa shell, and does not interfere with, nor is it interfered with by the spa cover. The video monitor can be rotated to be viewed from just about any location inside or outside the spa. A homeowner can enjoy the video monitor in his backyard when he is not using the spa by rotating the screen. The video controls can be accessed through an integrated remote control system, allowing the video monitor to be controlled without activating the spa controls.

Figure 1:
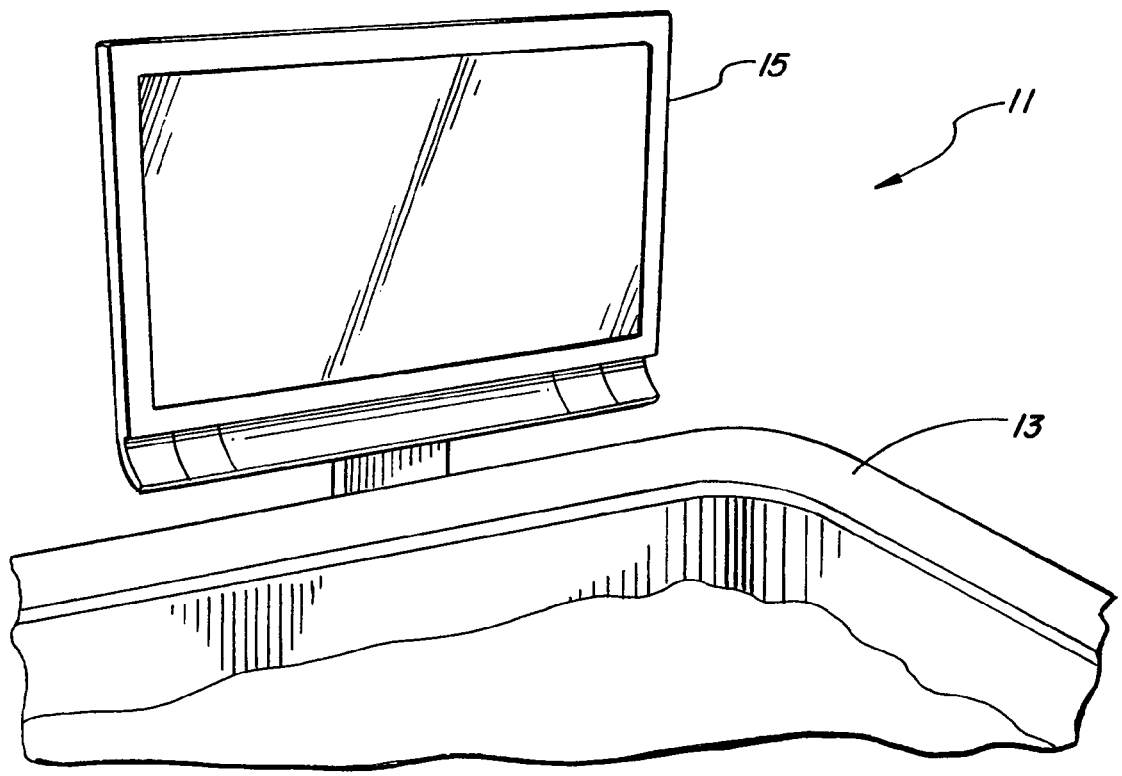
FIG. 1 is perspective of a video entertainment unit in combination with a spa, according to the present invention.
Figure 2:
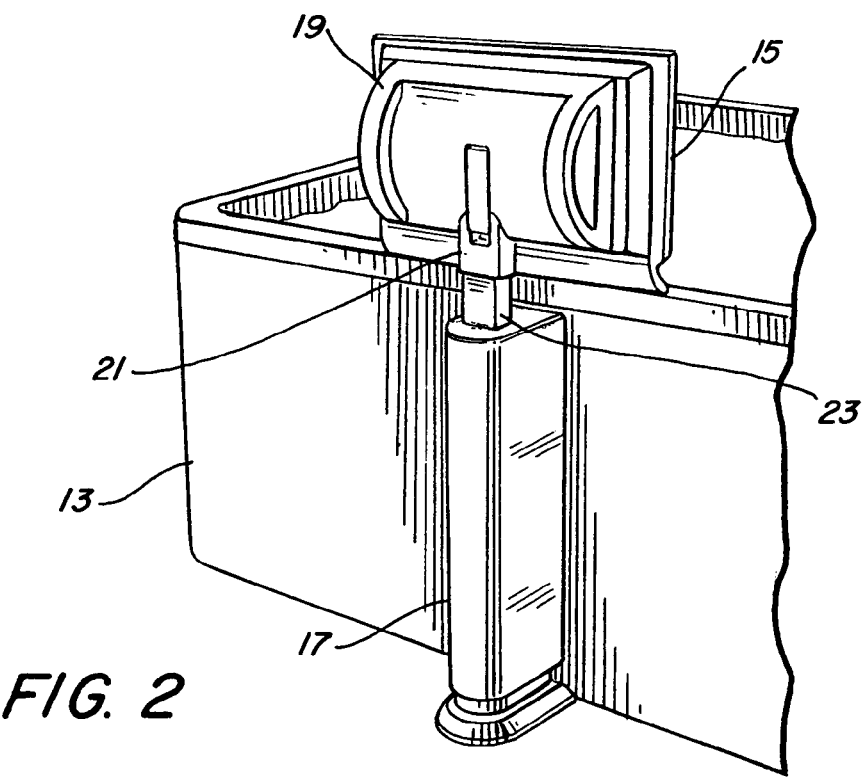
FIG. 2 is perspective of the video entertainment unit in combination with the spa, according to the present invention.

The video entertainment system 11 of the present invention is shown in FIG. 1. It includes a video monitor 15 located next to a spa tub 13. As shown in FIG. 2, the video monitor 15 has handles 19 for removing the video monitor 15 from a mounting post 17, and for carrying. By disconnecting the first half of a plug connector 21 located on the video monitor 15 from a second half of a plug connector 23 located on mounting post 17, the video monitor may be carried to a new location.

Figure 4:
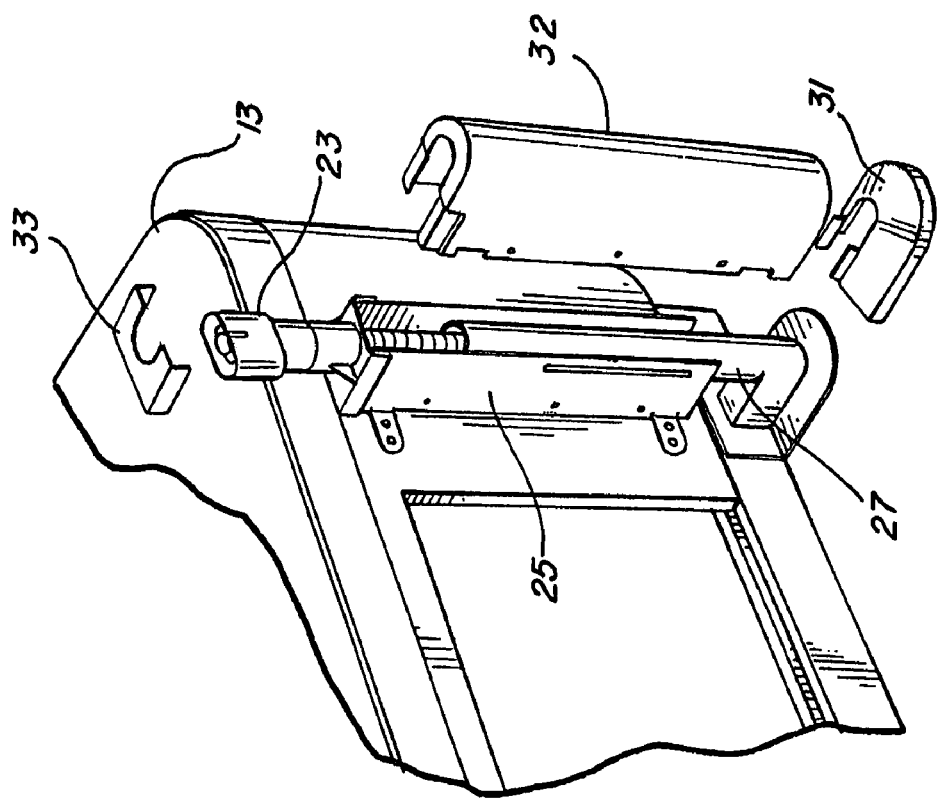
FIG. 4 is an exploded perspective of the mounting post for the video entertainment unit, according to the present invention.
Figure 3:
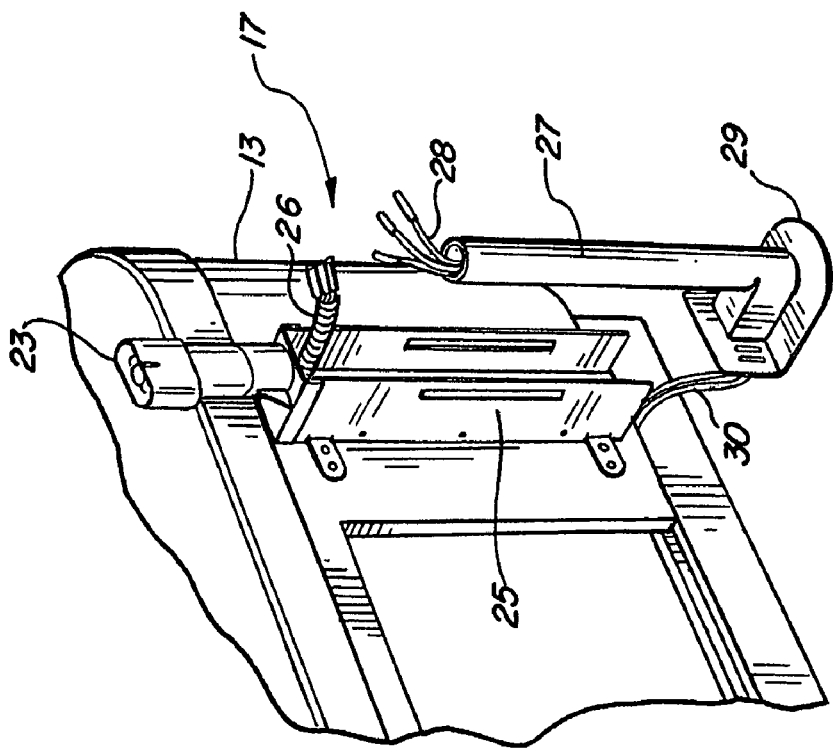
FIG. 3 is an exploded perspective of the mounting post for the video entertainment unit, according to the present invention.

FIG. 3 illustrates the component parts of the mounting post 17 as being constructed of two basic parts, an upper support bracket 25 and a lower support bracket 27. Lower support bracket 27 has a foot 29 which rests on the ground, step 1, when lower support bracket 27 is inserted into upper support bracket 25 as shown in FIG. 4. A wiring harness 26 in upper support bracket 25 connects to the second half plug 23, mounted on the upper support bracket 25. The wiring harness 26 connects to the wiring harness 28 on lower support bracket 27. Wiring harness 28 runs through lower support bracket 27 and connects by cables 30 to a signal source (not shown). Once the upper support bracket 25 and lower support bracket 27 are assembled together as shown in FIG. 4, plastic cosmetic covers are placed over the structure. A body cover 32 fits over the body of the entire assembled support post. A base cover 31 fits over the foot 29 of the lower support bracket 27. A top pipe cover 33 fits over the top of the post.

When support post 17 is not in use, a protective cover 35 (FIG. 5), having a key slot 36 therein fits over the second half of plug 23 which has a meeting finger 24.

FIG. 6 illustrates the video monitor 15 and its first half plug 21 which has an engagement handle or lever 37 as more clearly illustrated in FIG. 7. When the video monitor 15 is mounted on the post 17, the video monitor is placed so that first half plug 21 of the video monitor 15 fits over second half plug 23 of support post 17 so that the key slot 22 of the first half plug 21 matches the key finger 24 of the second half plug 23. The lever 37 is moved downward in the direction of arrow 39 (by human hand as illustrated) to force the two plug halves 21 and 23 to engage structurally and electrically.

Figure 8:
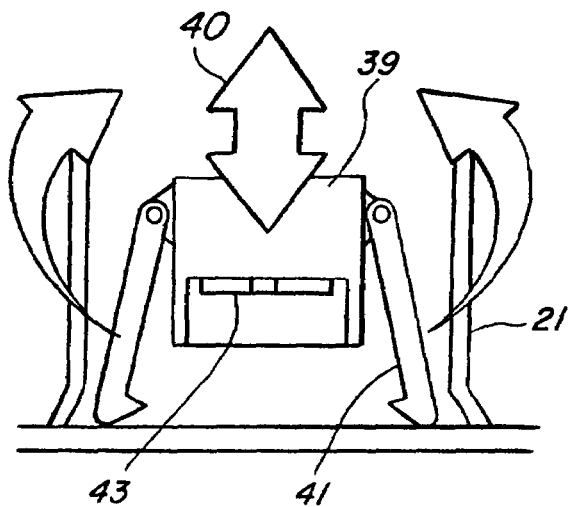
FIG. 8 is a plan view of the first half of the plug attached to the monitor, according to the present invention.
Figure 9:
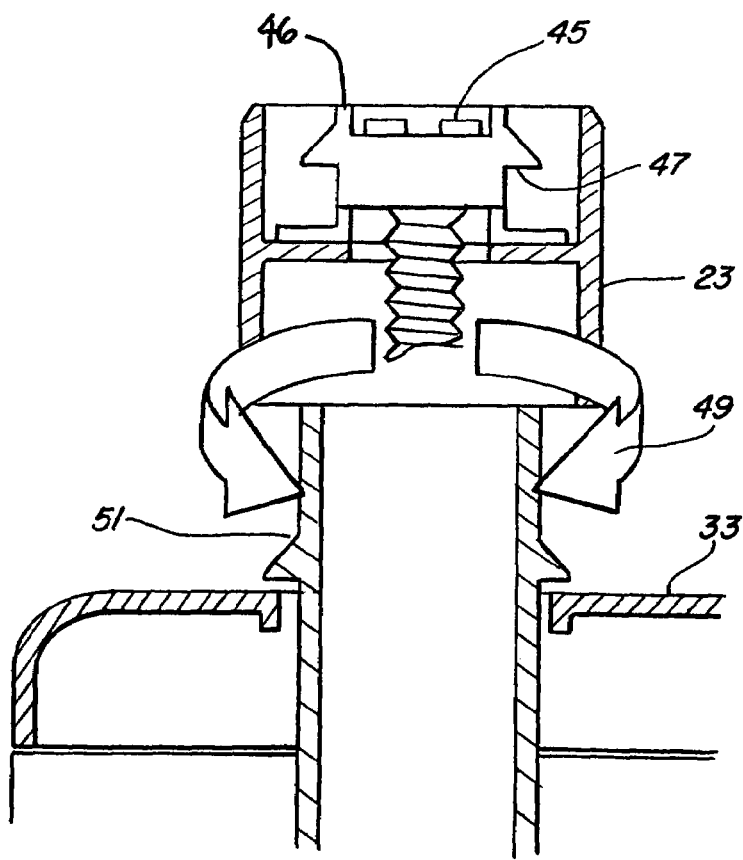
FIG. 9 is a plan view of the second half of the plug attached to the mounting post, according to the present invention.

FIG. 8 illustrates the structure within first half plug 21 that performs this function. An electrical connection block 42 having pin connectors 43 therein is mounted within the first half plug connector housing 21 so that it can move in the direction of arrow 40 upon movement of the hand activated lever 37. As the connector casing 42 moves up and down in the direction of arrow 40, a pair of grasping levers 41 pivot out or inward depending on the up or down movement of connecting block 42. As the connecting block 42 moves up, the grasping levers 41 close to grasp the edges 47 (FIG. 9) on electrical connector block 46 in the second half plug 23. The second half plug 23 has connector receptacles 45 adapted to matingly engage the connector pins 43 in the first half plug 21. The second half plug 23 is mounted on pole mount 51 in a manner which allows it to rotate in the direction of arrows 49 in a horizontal plane. Applicant contemplates, however, that the second half plug connector 23 could be mounted in a manner that would provide movement in more than one plane by using a gimbal structure well known in the art.

Figure 10:
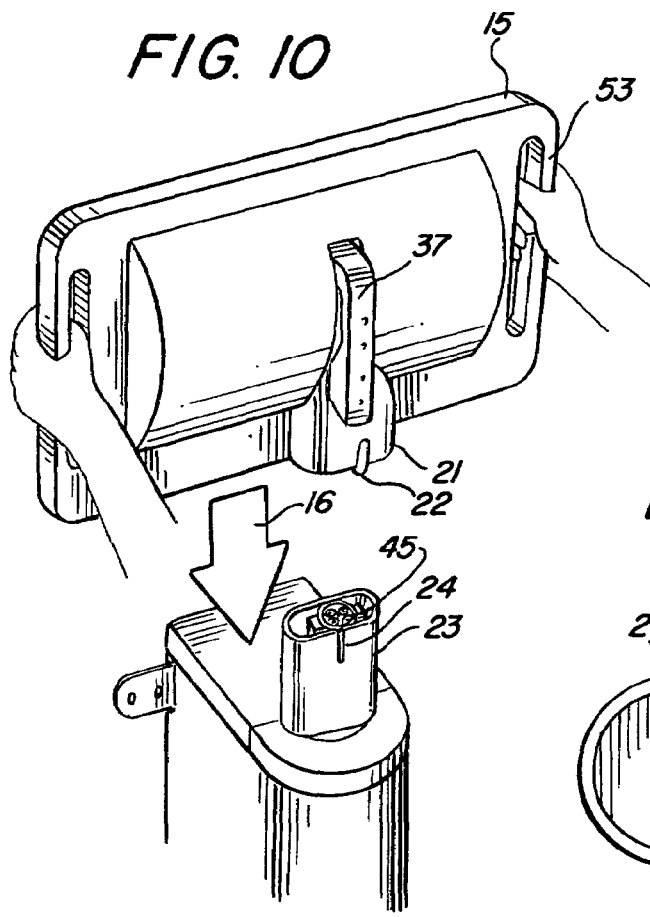
FIG. 10 is a perspective view showing the monitor of the present invention being attached to the mounting post.
Figure 11:
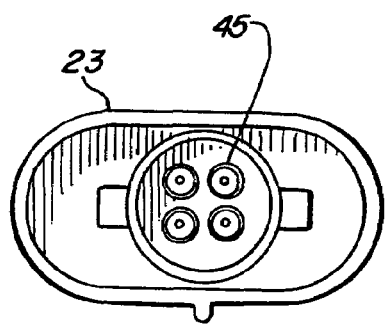
FIG. 11 is a plan top view showing the second half of the plug connector which is attached to the mounting post, according to the present invention.

Referring now to FIG. 10, the connection of the video monitor 15 to the mounting post 17 is illustrated. As the video monitor 15 is grasped by handles 53 and moved in the direction 16 so that the upper connector 21 with its key slot 22 is aligned with the second half connector 23 with its key finger 24. The electrical contact receptacles 45 in the second half connector are brought together in mating engagement with the contact pins in the first half connector, as explained above. The lever 37 is then activated to securely fasten the first half and second half plugs together, both physically and electrically.

Figure 12:
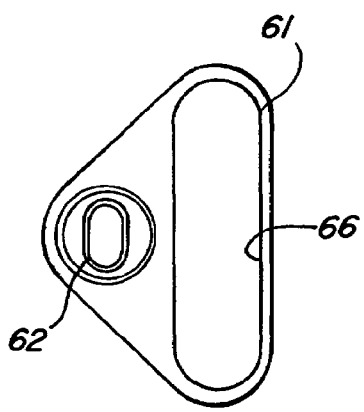
FIG. 12 is top plan view of a tray for attachment to the mounting post of the present invention.
Figure 13:
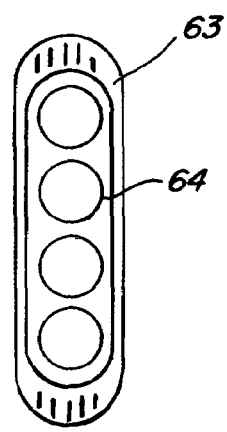
FIG. 13 is a cup holder insert that could be used with the tray of FIG. 12.

FIG. 12 illustrates an accessory that may be utilized with or without the TV monitor mounted on the mounting post. FIG. 12 illustrates a towel rail 61 which mounts to the mounting post 17 by passing over the second half plug 23 and is held in place by the mating shape of the aperture 62 in the towel rail 61 which matches the shape of the second half plug 23. The aperture 66 for holding the towels is sized to receive a tray 63 (FIG. 13) which may be designed as a cup holder or with cup holder apertures 64 therein, or simply be a tray for holding appetizers. When the towel rail 61 is utilized for holding a towel 67 (FIG. 14), the tray 63 is simply not used.

When the spa is not being used, an important feature of the present invention allows the video monitor to be moved to a location other than the spa as desired by the user, by use of a docking station 55, located on any convenient surface 73, which is ready to receive the first half plug 21 of the video monitor by the docking station second half plug 71.

Figure 16:
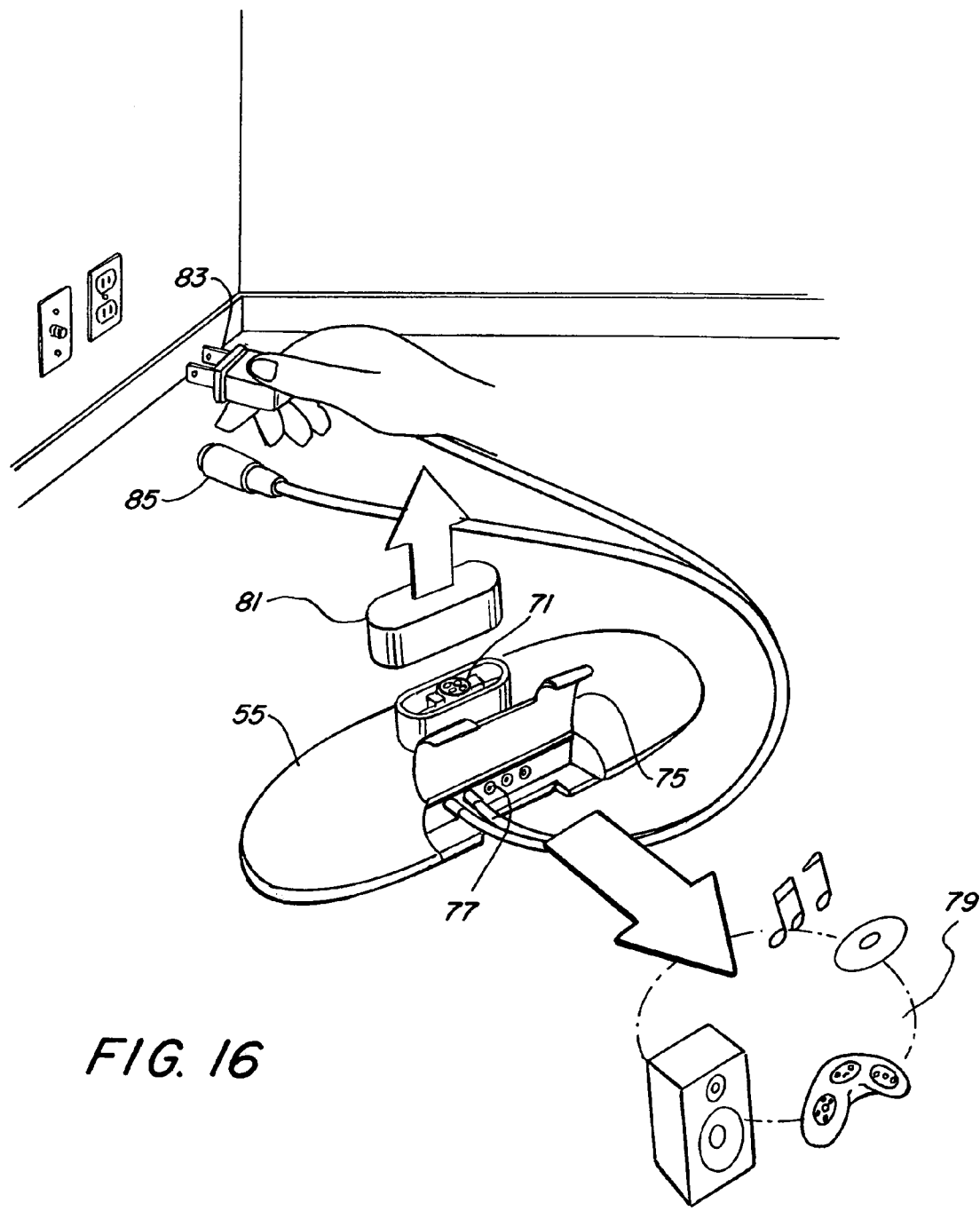
FIG. 16 is a perspective illustration showing the connection of the docking station, according to the present invention.

FIG. 16 illustrates the connection of the docking station 55 to a wall outlet by a plug 83 for receiving power and by a coaxial hookup 85 for receiving a video signal. In addition, the docking station 55 has a back cover 75 which lifts up to reveal connector access 77 for gaming equipment and other video and audio connections.

When it is desired to mount the video monitor 15 on the docking station 55, the protective cap 81 is removed from the second half plug 71 and the video monitor 15 is then grasped by the handles 53 (FIG. 17) and moved in the direction 16 so that the first half plug 21 on the monitor 15 engages the second half plug 71 on the docking station 55 so that the key slot 22 on the first half plug 21 is aligned with the key finger 70 on the second half plug 71 of the docking station 55. The handle 37 is moved as disclosed hereinabove to force the two half plugs together physically and electrically.

Once the video monitor 15 is mounted on the docking station 55, control of the video monitor is conveniently provided by a remote control handheld radio frequency device 57.

The mating first half and second half connectors 21 and 23 of the present invention establish the necessary power, control and video and audio signals for the system. This mating connector is designed to withstand extreme weather conditions and the spa environment while facilitating rotation of the video monitor. Moreover, the connector is designed to comply with all safety requirements and prevent user access to hazardous voltage during the connection and disconnection process.

Figure 19:
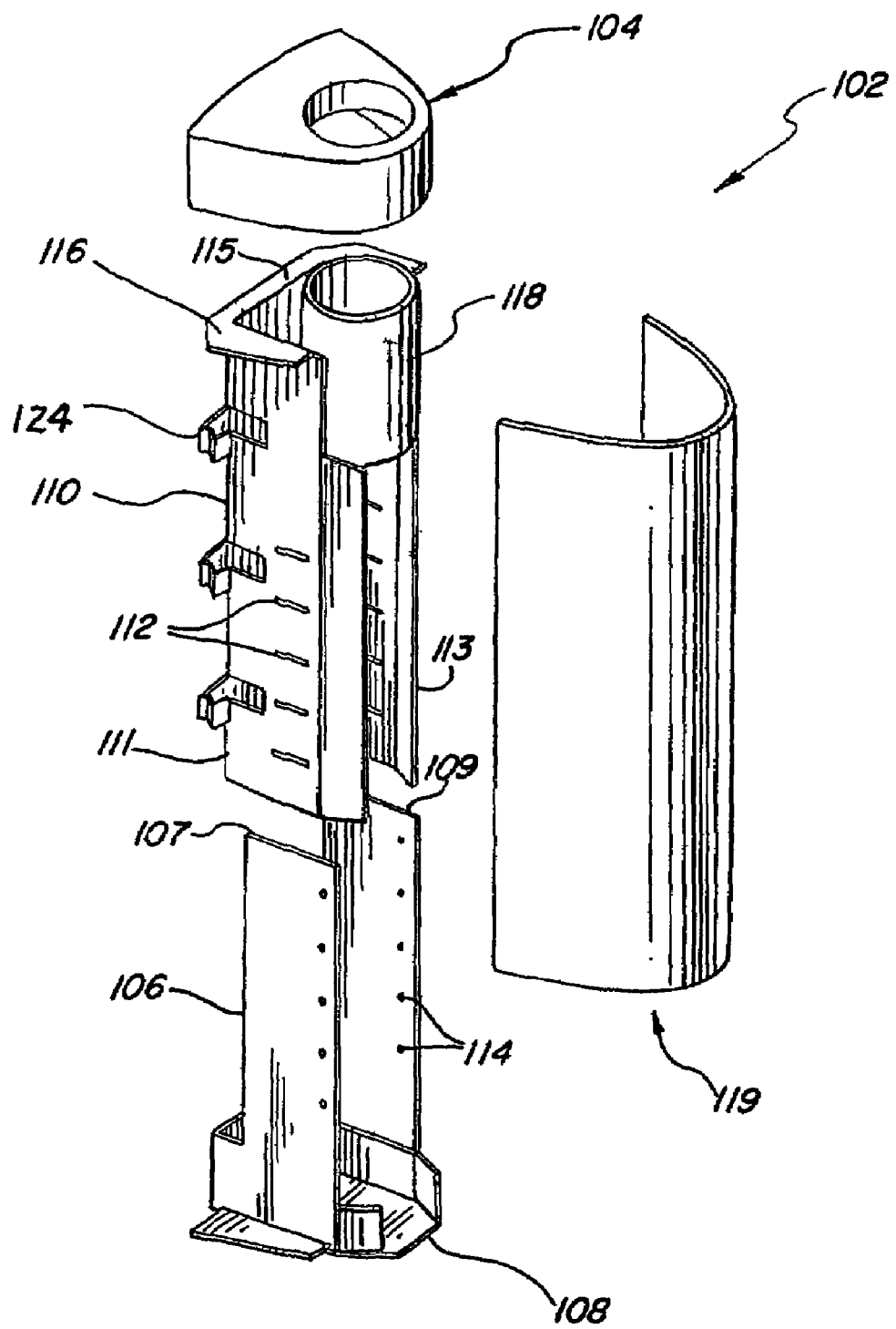
FIG. 19 is an assembly drawing of an alternate embodiment of the mounting post.
Figure 20:
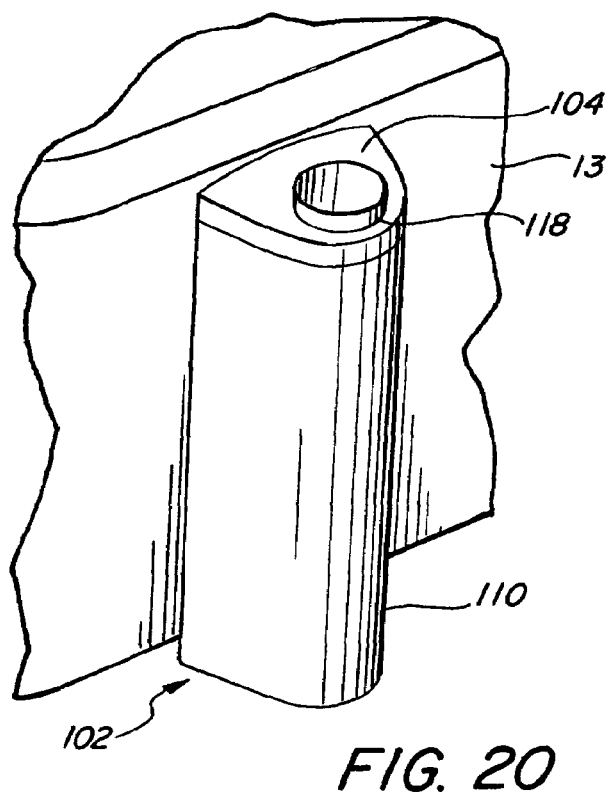
FIG. 20 is a perspective of the assembled mounting post of FIG. 19.

FIGS. 19 and 20 illustrate an alternate preferred embodiment for the support post of the video monitor. FIG. 19 is an assembly drawing showing the major parts of the post 102. FIG. 20 shows the post 102 attached to the side of the spa 13. The post 102 has an internal support structure made up of a base bracket 106 and a wall post bracket 110. The base bracket 106 is preferably made of sheet metal of a sufficient thickness to support the weight required. The base bracket 106 has a pair of upstanding legs 107 and 109 and a foot 108 attached thereto. The upstanding legs 107 and 109 have apertures 114 therein aligned on the vertical. The base bracket 106 is bolted to the concrete slab on which the spa sits by bolts passing through apertures (not shown) in foot 108.

The second part of the post, the wall bracket 110, includes a U-shaped bracket having parallel legs 111 and 113 and a back 115, preferably made out of sheet metal of the desired thickness. Parallel legs 111 and 113 of wall bracket 110 has a plurality of slots 112 therein at preset aligned locations on the vertical. These slots are used in conjunction with the apertures 114 in the base bracket 106 for height adjustment of the post 102, as desired.

Once the wall bracket and the base bracket are assembled, the wall bracket is fastened to the spa panel by screws (not shown) through the back panel 115 of wall bracket 110.

The wall bracket 110 has a pair of ears 116 extending out from the parallel panels 111 and 113 at the top of the wall bracket. These ears 116 are Z-shaped so that the other end of ear 116 is located within the U of the wall bracket and acts as a ledge to support a conical shaped support top 118 of the pole 102.

A pre-formed plastic housing 104 having an aperture therein that slightly exceeds the diameter of the post top 118, is then placed over pole top 118 so that it rests upon the top of ears 116.

A plurality of fastening devices 124 such as finger springs are attached to the sides of the wall bracket 110. An extruded cover 119, preferably made out of aluminum, is cut to length to match the height of the pole 102. It is then wrapped around the assembled wall and base bracket so that it presents a clean, unitary appearance, as shown in FIG. 20.

Figure 21:
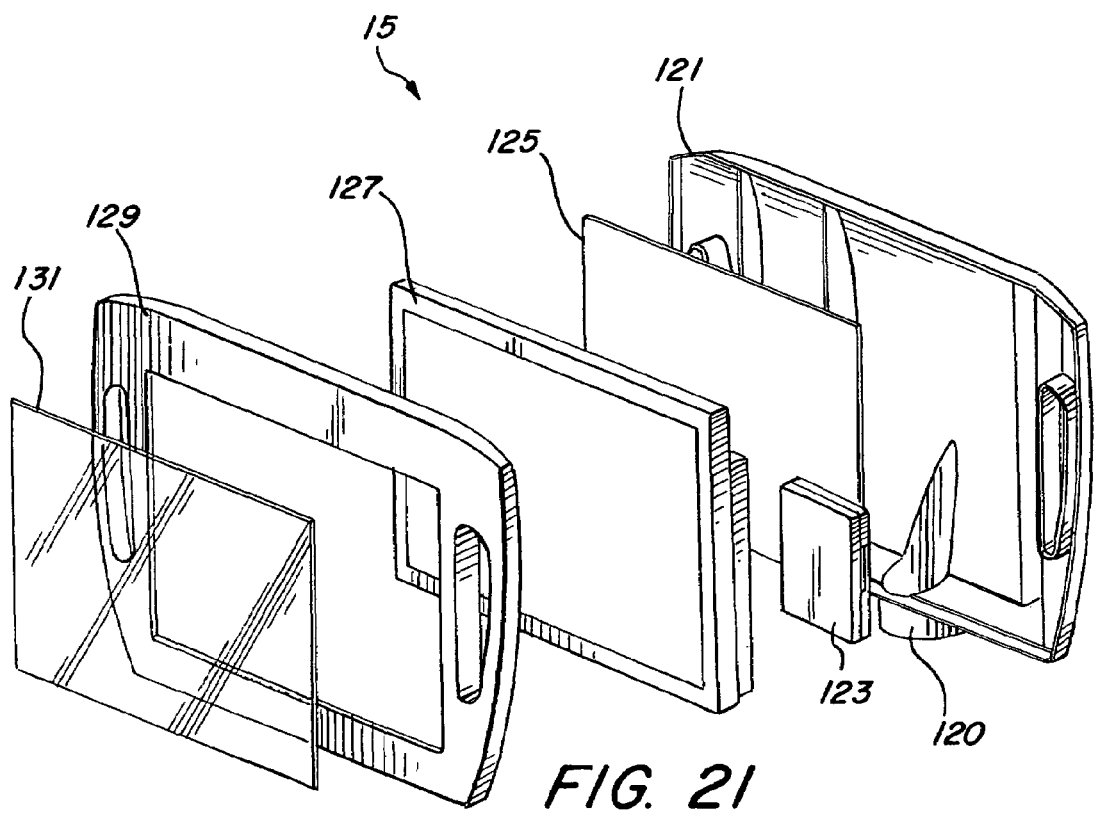
FIG. 21 is an assembly drawing of the monitor of the present invention.

The video monitor 15 that mounts to the pole is more specifically illustrated in FIG. 21. The basic working parts of the monitor 15 includes a rear housing 121 having a cylindrical-shaped connection port 120 as will be more fully explained hereinafter. A front housing panel 129 which mounts to the rear housing. A liquid crystal display 127, an electronic PC board 125, and a DVD player 123 are contained inside. A lens 131 fits over the liquid crystal display 127 mounted within the frame of the front housing panel 129.

Figure 22:
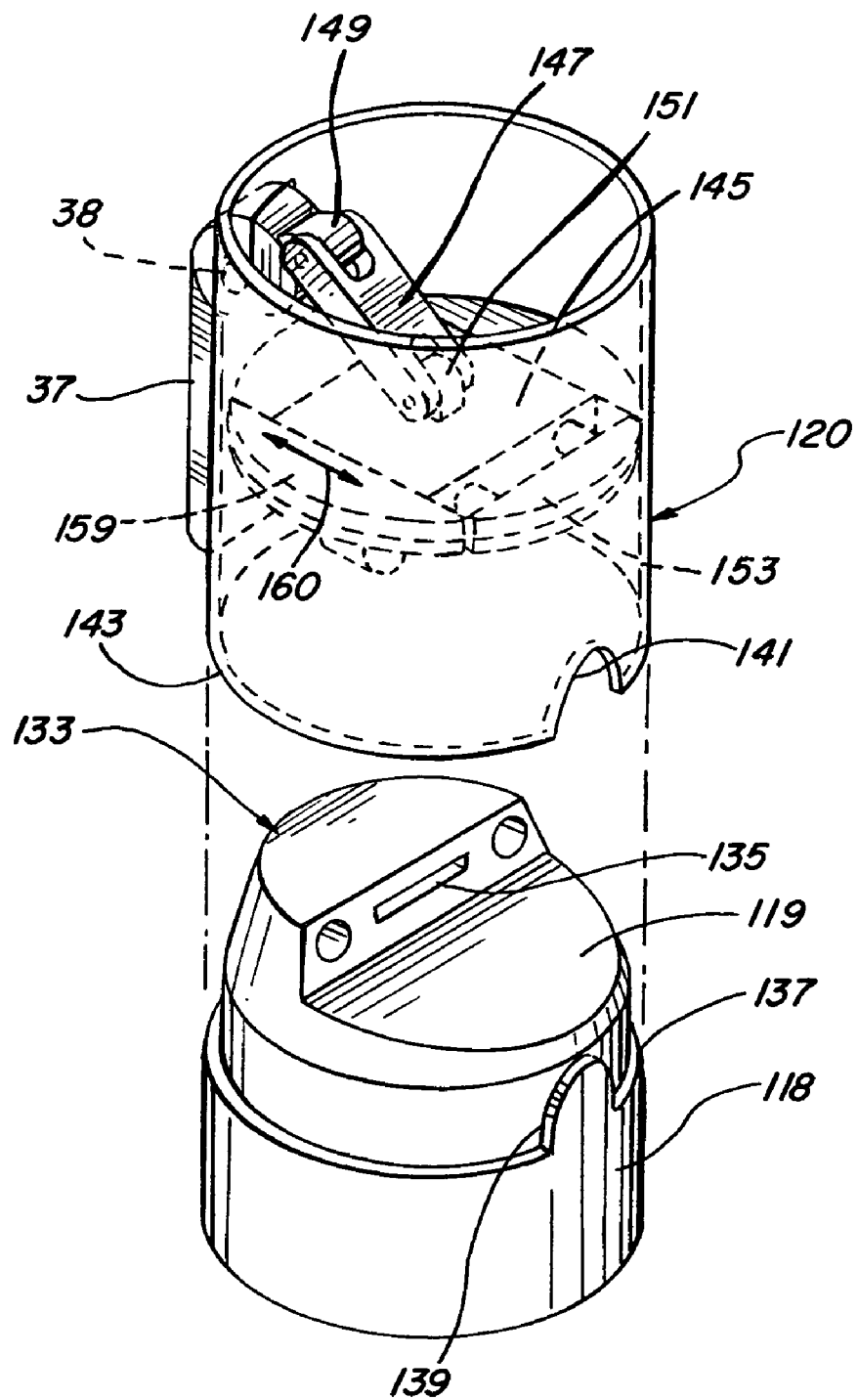
FIG. 22 is an assembly drawing, partially in section, of an alternate embodiment for connecting the monitor to the post.

FIG. 22 illustrates in more detail the structure of connecting port 120 which is attached to the video monitor and the top portion of the post 118 that is formed to mate with the connecting port 120. The connection port 120 has a mechanism contained therein which includes a lever arm 37 that rotates around a shaft 38 mounted to the housing of connection port 120. A cam end 149 of lever 37 is attached to a link 147. A plate 145 having a pivoting connection stud 151 attached thereto is slidably supported by a support structure 159 mounted within port housing 120 so that platform 145 can move laterally substantially along a horizontal plane in platform 159 which is substantially perpendicular to the top of the post 113 in the direction of arrows 160. The other end of link 147 is attached to the connection stud 151 of plate 145. A spring buffer 153 is connected to the end of platform 145. A key slot 141 is located in the bottom surface of the connection port housing 120, on a side opposite to the side of the lever arm 37.

The top of the mounting post 118 is shaped to receive the connection port 120 so that the bottom edge of connection port 120 rests upon a circumferential ledge 137 located around post 118. A key 139 formed into the sidewall of post 118 matches the key slot 141 in connection port housing 120 to ensure that connection port 120 is only attached to post 118 in one orientation. Connection post 118 has an upstanding portion 133 which rises above the main top portion 119 a sufficient distance to place a connecting slot 135 along a substantially horizontal plane for connection from the side of the post in the vertical space between the two surfaces.

Figure 23:
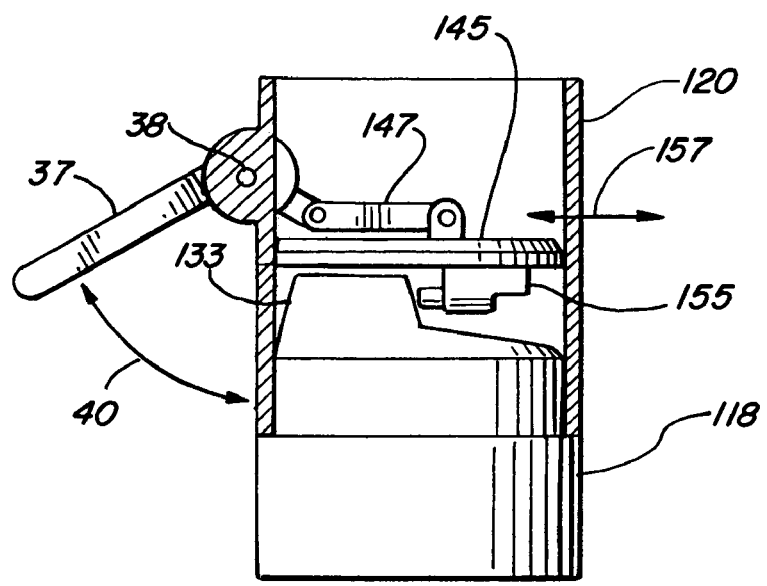
FIG. 23 is a cross-section of the two connector halves of FIG. 22 showing the electrical connector disengaged.
Figure 24:
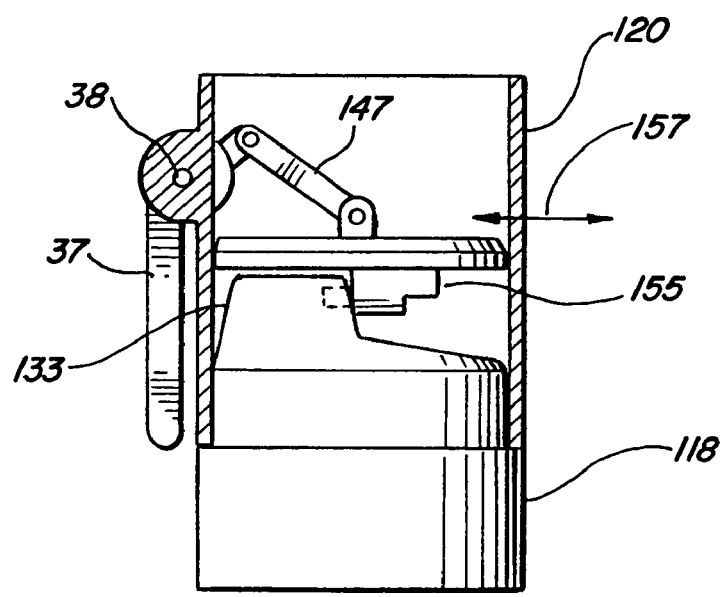
FIG. 24 is a cross-section of the two connector halves of FIG. 22 showing the electrical connector engaged.

Referring now to FIGS. 23 and 24 which show the connection port 120 and the mounting post 118 in an engaged relationship, FIG. 23 illustrates the connection port mounted on top of the post 118 before electrical connection is made. FIG. 24 illustrates the two mounted together with electrical connection made.

Before the video monitor is mounted on the post, the connection port 120 must be set in its open state as illustrated in FIG. 23 by moving the lever arm 37 away from the housing in the direction of the arrow 40 by pivoting it on its axis 38. This pivoting action will cause the cam surface connected to linkage 147 to move in the direction of arrow 157, thereby pushing the platform 145 and the connector 155 attached to the underside of platform 145 to the right into a position of disengagement with the post 133.

Once the video monitor is correctly mounted on the post as guided by the key slot 141 and key 139, electrical connection between the video monitor and the rest of the system installed at the spa is accomplished by simply pushing the lever 37 in the opposite direction, as shown by arrow 40 towards the housing of the mounted connection port 120. This action will cause the cam surface of the lever 137 to pull the linkage 147 to the left in the direction of arrow 157 which will pull the platform 145 and the connector plug 155 mounted to the underside of the platform into the connecting slot 135 of the post 133 making physical electrical connection with the multi-pin connector located therein (not shown).

A wiring harness (not shown) is physically and electrically connected to the multi-pin male connector 155. This wiring harness is used to provide all the required control and power signals for a system circuit located in the housing for the video monitor. A female multi-pin connector, located in the post 133, is engaged by the male connector 155 through slot 135 in the post 133. A wiring harness provides control and power signals from a source outside of the video monitor to the female connector.

Figure 25:
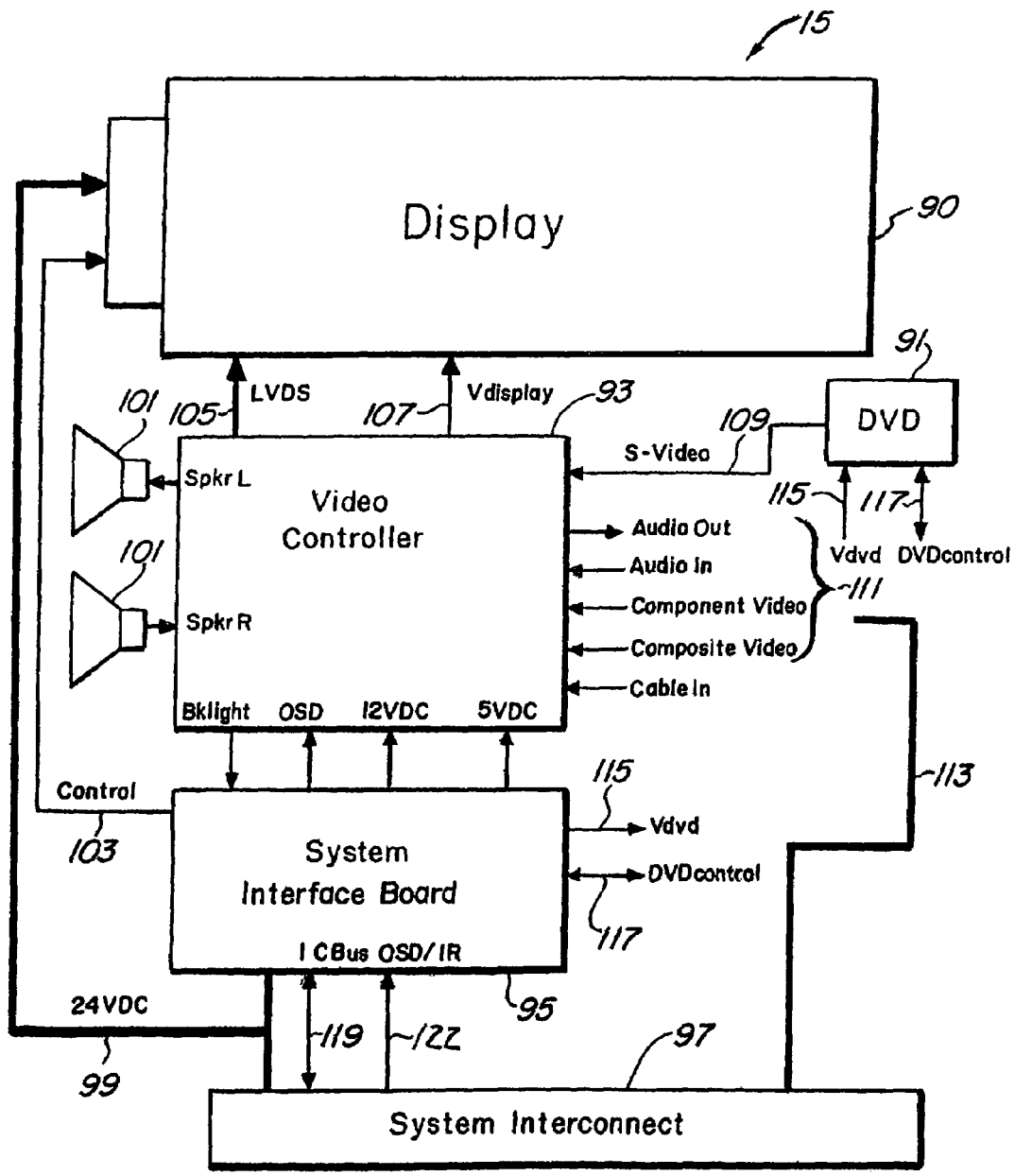
FIG. 25 is a block diagram illustration of a preferred system for the video monitor.

The video monitor 15 as illustrated in FIG. 25 is contemplated as having a 23 inch 16:9 aspect ratio LCD display 90, a DVD player 91, a video controller board 93, system interface board 95, speakers 101, system interconnect circuitry 97, as well as associated cables 111, 113, 103, 115 and 117 connecting these parts together. The video monitor of FIG. 25 is thereby capable of being mounted either on the mounting pole 17 for use at the spa or on the docking station 55 for use at a location away from the spa.

The video monitor 15 as illustrated in FIG. 25 contains a system interconnect circuit 97 which joins the video monitor unit to the spa main control system and/or the base docking station for the purpose of receiving power and spa control signals, video source signals, audio source signals, and on screen display (OSD) push button inputs, as well as infrared input codes, for connection through the system interconnect circuit 97 to the components of the video monitor 15. By bringing the various external signals into a single housing multi pin connector through the system interconnect circuit 97, the ability for the video monitor to rotate on the post is greatly enhanced.

The video display 90 contains an LCD screen and a backlight unit. The LCD screen displays the program information to the viewer as selected from the various input sources. The video display 90 receives onscreen display control signals from the video controller 93. The video display 90 receives control signals such as dimming and brightness control from the system interface board 95. The video display 90 receives its backlight power from the system interconnect 97 and its LCD power from the video controller 93.

The video controller 93 processes the various input from program sources such as the DVD player 91, via an S video port, cable TV input, component video, or composite video, for example, and directs those signals to the video display 90. The video controller 93 also has audio inputs and outputs as well as a small audio amplifier to directly drive the internal speakers 101. The video controller 93 receives power from the system interface board 95. It receives onscreen display (OSD) control signals from the system interface board 95. It also receives onscreen display (OSD) control signals from the system interface board 95 for controlling various video display parameters.

The system interface board 95 processes control signals from the spa main control system and provides power for the video controller by taking the 24V supply voltage from the system interconnect 97 and conditioning it into supply voltages required by the video controller 93, the video display 90 and the DVD player 91. The system interface board 95 translates control information from the spa main control system received from the system interconnect 97 into control signals for the DVD player 91 and the video controller 93. The system interface board 95 controls the LCD backlight brightness and dimming. The system interface board 95 receives infrared (IR) signals from the system interconnect 97 over line 122 and processes the IR code into control signals for the video controller 93. The system interface board 93 receives on screen display (OSD) input signals from user accessible pushbuttons (not shown) connected to the system interconnect 97. These signals are passed up to the video controller 93 for processing over line 122.

In this manner the video monitor 15, is capable of being mounted for complete use either on the mounting pole 17 at the spa or on the docking station 55 for use at a location away from the spa.

What is claimed is:

1. A combination spa and video entertainment system comprising:
    a tub adapted to hold water and accommodate at least one person fully immersed therein, the tub having a bottom and sidewalls surrounding the bottom, the sidewalls having an upper edge extending around the tub;
    a support post having a top and bottom attached to a sidewall of the tub;
    a first half of a multi-pin connector located in the top of the support post along a horizontal plane perpendicular to the top of the support post and adapted for connection from a side of the support post;
    a video monitor having a top and bottom;
    a connecting port located at the bottom of the video monitor adapted for attachment to the top of the support post; and
    a second half of a multi-pin connector located in the connecting port along a horizontal plane perpendicular to the top of the support post and adapted for movement along a horizontal plane, after the connecting port is attached to the support post, to engage the first half of the multi-pin connector.

2. The combination spa and video entertainment system of claim 1, wherein:
    the top of the support post and the connecting port at the bottom of the video monitor are keyed to ensure the two only attach in a certain way.

3. The combination spa and video entertainment system of claim 1 further comprising:
    a lever activated engagement mechanism attached to the connecting port and the second half of the multi-pin connector for moving the second half of the multi-pin connector into and out of engagement with the first half of the multi-pin connector.

4. The combination spa and video entertainment system of claim 3 wherein the lever activated engagement mechanism comprises:
    a hand activated lever mounted to the exterior of the connecting port for pivotal movement; and
    a linkage pivotally connected to an end of the lever, opposite a hand activated end, and pivotally connected to the second half of the multi-pin connector.

5. The combination spa and video entertainment system of claim 1, further comprising:
    a separate video monitor docking station having a top and bottom; and
    first half of a multi-pin connector located at the top of the docking station adapted for mating with the second half of a multi-pin connector located in the connecting port at the bottom of the video monitor.

6. The combination spa and video entertainment system of claim 5 wherein said docking station contains a removable remote control device for the video monitor.

7. The combination spa and video entertainment system of claim 5 wherein said docking station may be located on any convenient flat surface.

8. The combination spa and video entertainment system of claim 5, wherein:
    the docking station is adapted to receive video input from multiple sources including game controller signals.

9. The combination spa and video entertainment system of claim 5, wherein:
    the docking station is adapted to receive video input from multiple sources including game controller signals.

10. The combination spa and video entertainment system of claim 1, further comprising:
    a video control system located at the tub.

11. The combination spa and video entertainment system of claim 10, wherein:
    said video control system is adapted to receive and process video and audio signals for a DVD player.

12. The combination spa and video entertainment system of claim 11, wherein:
    said video control system is adapted to interface with a system for controlling the tub operation.

13. The combination spa and video entertainment system of claim 12, wherein:
    the video control system interface with the tub system control is adapted to receive remotely transmitted signals sent to the tub system control, for controlling the video control system.

14. The combination spa and video entertainment system of claim 13, wherein:
    the video control system supplies power and video signals to the video monitor and audio signals to speakers.

15. A combination spa and video entertainment system comprising:
- a tub adapted to hold water and accommodate at least one person fully immersed therein, the tub having a bottom and sidewalls surrounding the bottom, the sidewalls having an upper edge extending around the tub;
- a support post adapted for attachment to a sidewall of the tub, the support post including:
- a base bracket having two upstanding legs attached to a foot, the two legs having apertures along the length of the legs, the foot adapted for fastening to a support base;
- a wall bracket formed in a U-shape by a pair of parallel legs and a back, the parallel legs having slots along the length of the legs, the legs formed to partially surround the base bracket, the wall bracket being fastened to a sidewall of the spa;
- a post top attached to a top portion of the wall bracket; and
- a video monitor having a top and bottom, adapted for mounting on the post top of the wall bracket;
- whereby the base bracket and wall bracket are adjustable with respect to height by aligning certain slots in the wall bracket with certain apertures in the base bracket.

16. The combination spa and video entertainment system of claim 15 further comprising:
- an extruded cover adapted for covering the exterior of the base and wall bracket, after attachment to the spa sidewall; and
- a housing fitting over the post top, top of the wall bracket, and the extruded cover.

17. The combination spa and video entertainment system of claim 15, further comprising:
- a first half of a multi-pin connector located in the post top along a horizontal plane perpendicular to the top of the post top and adapted for connection from a side of the post;
- a connecting port located at the bottom of the video monitor adapted for attachment to the top of the post top; and
- a second half of a multi-pin connector located in the connecting port along a horizontal plane perpendicular to the top of the post top and adapted for movement along a horizontal plane to engage the first half of the multi-pin connector.

18. The combination spa and video entertainment system of claim 17, wherein:
the top of the support post and the connecting port at the bottom of the video monitor are keyed to ensure the two only attach in a certain way.

19. The combination spa and video entertainment system of claim 17 further comprising:
a lever activated engagement mechanism attached to the connecting port and the second half of the multi-pin connector for moving the second half of the multi-pin connector into and out of engagement with the first half of the multi-pin connector.

20. The combination spa and video entertainment system of claim 17, further comprising:
- a separate video monitor docking station having a top and bottom; and
- a first half of a multi-pin connector located at the top of the docking station adapted for mating with the second half of a multi-pin connector located in the connecting port at the bottom of the video monitor.

21. The combination spa and video entertainment system of claim 20 wherein said docking station contains a removable remote control device for the video monitor.

22. The combination spa and video entertainment system of claim 20 wherein said docking station may be located on any convenient flat surface.

23. The combination spa and video entertainment system of claim 17, further comprising:
a video control system located at the tub.

24. The combination spa and video entertainment system of claim 23, wherein:
said video control system is adapted to receive and process video and audio signals for a DVD player.

25. The combination spa and video entertainment system of claim 23, wherein:
said video control system is adapted to interface with a system for controlling the tub operation.

26. The combination spa and video entertainment system of claim 25, wherein:
the video control system interface with the tub system control is adapted to receive remotely transmitted signals sent to the tub system control, for controlling the video control system.

27. The combination spa and video entertainment system of claim 26, wherein:
the video control system supplies power and video signals to the video monitor and audio signals to speakers.

* * * * *